Oct. 26, 1971 L. LE BEAU Re. 27,203

INEXPENSIVE CLINICAL THERMOMETER

Original Filed Jan. 21, 1965

INVENTOR.
LEE LE BEAU
BY
ATTORNEY

United States Patent Office

Re. 27,203
Reissued Oct. 26, 1971

27,203

INEXPENSIVE CLINICAL THERMOMETER

Lee Le Beau, Venice, Calif., assignor to K & L Associates, Ltd., St. Clair Shores, Mich.

Original No. 3,350,490, dated Oct. 31, 1967, Ser. No. 426,721, Jan. 21, 1965. Application for reissue Oct. 29, 1969, Ser. No. 871,504
Int. Cl. B29b *5/04;* G01k *5/22*
U.S. Cl. 264—275 16 Claims

Matter enclosed in heavy brackets [ ] appears in the original patent but forms no part of this reissue specification; matter printed in italics indicates the additions made by reissue.

This invention relates to thermometers generally and more particularly to an improved high precision clinical thermometer and a new and superior apparatus and technique for its manufacture at far lower cost and greater reliability than by prior proposals. A one piece non-breakable tubular structure having a high precision passage therethrough of different diameter at one end than at the other is provided by use of a tensioned flexible core wire extending lengthwise of a mold cavity into which uncured thermoplastic material is charged under appropriate pressure and so distributed as to flow equitably along the sides of the core wire. The larger end of the core wire is withdrawn leaving a plastic shell or main body with a high precision capillary passage in communication at one end with a section of different size and suitable, for example, for use as a reservoir for thermally responsive fluid. According to one preferred mode of manufacture, the tubular member formed by the invention technique is, in major part, a relatively wide thin strip useful as a large area support for a suitable calibrated scale and also adding material to handling convenience and in preventing the instrument from rolling or moving from a place of rest.

The present invention has for its purpose the provision of an improved thermometer and a method for making the same so inexpensively and with such accuracy, uniformity and reliability that they can be discarded after a single use. All risk of transmitting virus, germs and diseased matter from one user to another is thereby precluded. Nor is it necessary to provide special equipment and procedures for sterilizing thermometers after use since the only precaution is their deposit in an approved receptacle.

The thermometer provided by this invention and the apparatus and method of producing the same represent a distinct departure from all prior proposals and provides a very rugged yet lightweight, nonbreakable thermometer of outstanding accuracy and reliability yet costing so little that they may be thrown away after a single use. The body of the instrument is formed of transparent thermoplastic material suitably compounded for use in injection molding equipment. This material is injected simultaneously into a multiple cavity mold each cavity of which is provided with a high precision tensioned core forming element. Following charging of the cavities and curing of the charge, the mold parts are separated and the wires are withdrawn from the individual castings or thermometer shells. A large number of these castings are then charged with a suitable colored fluid having the proper thermal expansive properties in a heated vacuum chamber following which the bore ends are sealed and the finished thermometers are allowed to cool.

Among other features of the invention is the fact that the thermometer shells are preferably formed in major part as flat thin strips adapted to be compactly packaged and providing a wide space for a readily readable temperature scale. Desirably this scale is formed of two groups of graduations disposed to either side of the bore and respectively representing temperatures below and above normal. This expedient expedites rapid and accurate reading. Preferably and for convenience in reading, the temperature indicia is printed to be read from the outer end of the thermometer while the bulb end is in place in the patient's mouth.

Accordingly it is a primary object of the present invention to provide an improved low cost throw-away thermometer of high precision and reliability despite its low cost.

Another object of the invention is the provision of an improved mass-production technique for making precision thermometers.

Another object of the invention is the provision of new and improved molding apparatus for simultaneously molding a multiplicity of precision thermometer shells from thermoplastic material.

Another object of the invention is the provision of a one-piece thermoplastic thermometer shell having a very fine high precision bore of uniform cross-section opening into an enlarged chamber at one end suitable for charging with thermosensitive fluid.

Another object of the invention is the provision of a molded plastic thermometer shell having a wide thin main body formed with a temperature scale and indicia, and preferably separated into two parts disposed on the opposite sides of the bore.

Another object of the invention is the provision of a multiple cavity mold having means for detachably seating therein a high precision core forming element together with means for placing this element under high tension so long as the mold is closed and being charged with fluent casting material.

These and other more specific objects will appear upon reading the following specification and claims and upon considering in connection therewith the attached drawing to which they relate.

Referring now to the drawing in which a preferred embodiment of the invention is illustrated.

Figure 1:
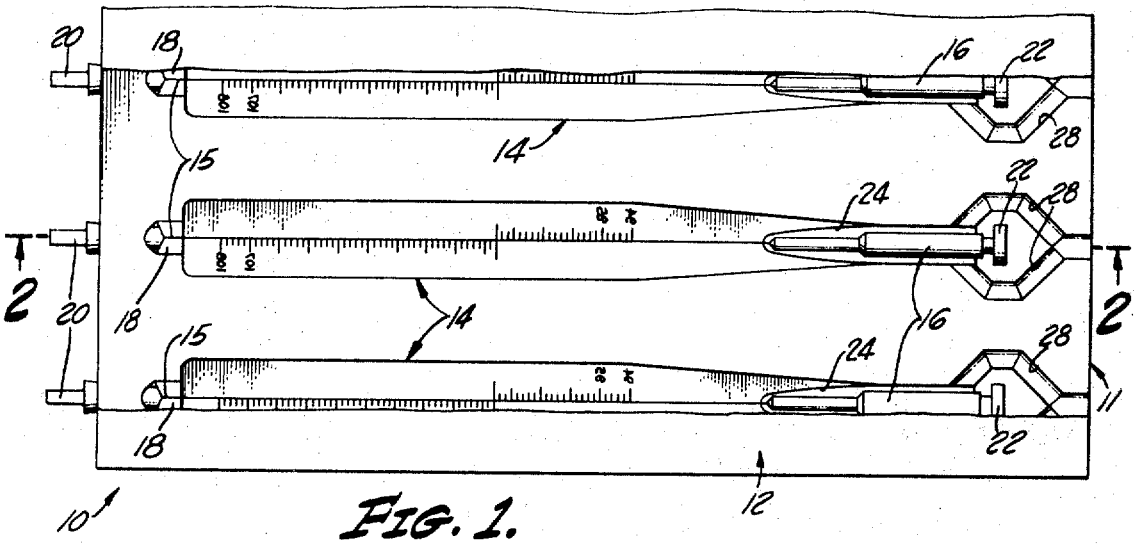
FIGURE 1 is a fragmentary top plan view of a multiple cavity mold suitable for use in practicing the present invention and showing a portion of the upper mold half broken away to disclose cavity details.
Figure 2:
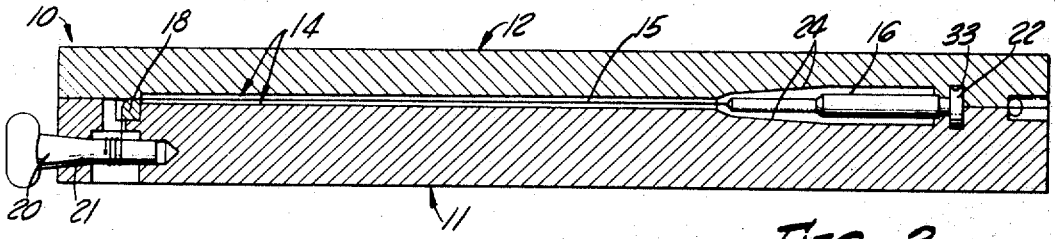
FIGURE 2 is a cross-sectional view taken along line 2—2 on FIGURE 1.

Referring more particularly to FIGURES 1 and 2 there is shown a preferred multiple cavity mold, designated generally 10, used in the manufacture of the invention thermometer. This mold comprises a lower member 11 and a cooperating upper mold member 12 each having a plurality of cooperating wells and interfitting dowel pins on their adjacent faces, not shown, for holding mating pairs of independent cavities 14, 14 in accurate registry with one another in the assembled position of the mold members. As herein illustrated, cavities 14 are shaped to form a thermometer shell having a strip-like main body 31 terminating at one end in a generally cylindrical or bulbous portion 41. Desirably the thickness of the stem or main body portion of the thermometer is substantially less than the outer diameter of reservoir 25 for the thermally sensitive fluid.

A particularly important feature of the molding apparatus is the provision of unique means for forming the ore or internal passage to be charged with temperature ensitive fluid. This means comprises a length of piano /ire or the like 15 of high-precision uniform diameter hroughout its length having an enlargement or tubular lement 16 at one end of suitable shape, such as is inicated in FIGURE 2. As herein shown, enlargement 16 ; formed separately from the core wire itself and has a lose-fitting central passage through which the core wire ; threaded. Wire 15 is suitably anchored to element 16 s by soldering, brazing, upsetting or otherwise. The oposite or free end of the core wire passes over a hardened ısert 18 suitably secured in place in one of the mold memers. The exposed face of insert 18 lies flush with the nterface between mold members 11 and 12 and is proided with a half-round groove extending to a suitable tenioning or take-up device such as the conventional takep peg used on stringed instruments to adjust the string ension. Such a peg is indicated at 20 which will be undertood as having a snug frictional fit in tapered openings 1 formed in lower mold member 11.

Enlargement 16 is provided with a flanged end 22 seatıg in a complementally shaped recess 23 of the mold nembers. As is made clear by FIGURE 2, this enlargeıent is smaller in diameter than the adjacent walls 24 f the mold cavity with the result that the thermometer hell includes a thin-walled bulbous portion 25 at one nd to provide a chamber 26 for the heat-sensitive fluid.

Each of cavities 14 includes a pair of charging sprues 8, 28 opening into its bulbous portion to either side of nlargement 16. The outer ends of the sprues preferably ıerge and are connected directly to the discharge pasage of injection molding equipment. Owing to the proviion of the branched sprues at the inlet to cavity 14 it /ill be recognized that the high pressure charge is quickly nd equitably distributed about the core forming memers 15, 16 throughout the cavity without any tendency ɔ shift the position of these core forming components.

Another feature of the mold cavity is the provision of raduation forming surfaces on one of the members. hese surfaces may be either raised or undercut to proide temperature graduations and indicia representing the ifferent temperature values over a suitable scale range uch as 94 to 108 degrees Fahrenheit if the thermometer ; to be used clinically. Desirably the graduations are diided into two major groups arranged along the opposite ides of the bore using the normal temperature indicated t 30 in FIGURE 3 as the dividing line. That is to say, he portion of the scale below normal temperature is hown as positioned on the lower side of the thermometer ore whereas the portion representing temperatures above ormal is located on the other side of the bore.

It is also advantageous to have the scale readings readble from a viewing point at the outer end of the therıometer thereby permitting the physician, nurse or other ttendant to take a reading while the bulb end is inserted ı the patient's mouth. Owing to the large area and the /idth of the thermometer large numerals readily read at distance are molded into the strip. Their arrangement in wo groups to either side of the normal temperature line lso enables the attendant to locate the upper end of the emperature sensitive fluid more quickly and to ascertain t a glance the deviation from the normal temperature epresented by line 30 and by the adjacent ends of the two roups of the graduations.

Figure 3:
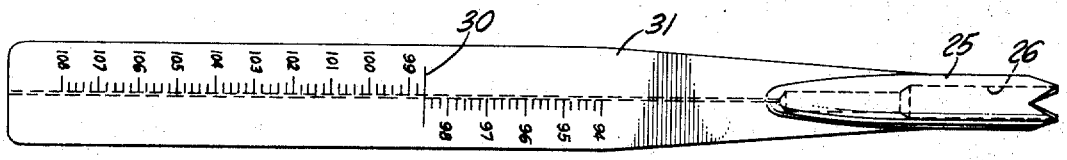
FIGURE 3 is a top plan view of one of the thermometer shells before being charged with its bulb end prepared for charging and sealing according to one preferred technique.
Figure 4:
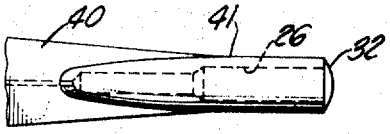
FIGURE 4 is a fragmentary view of the bulb end of a thermometer shown in FIGURE 3 after closure by an alternate technique.
Figure 5:
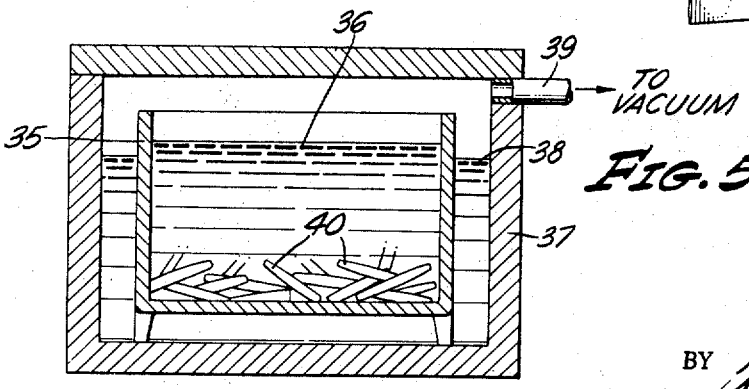
FIGURE 5 is a cross-sectional view through a vacuum type charging chamber showing a group of shells undergoing charging.

It will be understood that the larger end of the therıometer shell may be molded or formed in various congurations such as those indicated in FIGURES 3 and . The FIGURE 3 configuration shows the bulb end otched whereas FIGURE 4 shows the end cut off square nd fitted with a closure plug or cap 32 secured in place y heat bonding or adhesive. When the end is notched as hown in FIGURE 3 it may be quickly closed and sealed imply by pressing the end of the thermometer shell into conical recess maintained at a temperature high enough to fuse the pointed ends together as the latter are pressed together by the recess.

In using the described molding equipment, it will be understood that after the core wires are assembled into each of the cavities and tensioned sufficiently to assure holding them rigidly in position centrally of each cavity, the sprue inlets are connected to the charging outlets of standard injection molding equipment. A suitable transparent thermoplastic composition is then charged into the cavities under pressure following which the mold assembly is subjected to standard curing procedure well known to those skilled in the plastic molding art. After the plastic has taken a set the mold is opened, the molded parts are removed and the headed ends 22 of core members 16 are placed in a suitable fixture as the other end of wires 15 are disconnected from pegs 20 and the molded parts are then withdrawn over the free ends of these wires.

A large group of the thermometer shells are then placed in a receptacle 35 containing a suitable temperature sensitive fluid 36 having the requisite coefficient of expansion. Receptacle 35 is preferably located within a vacuum chamber 37 containing a heated liquid 38, which may be the same liquid used in charging the thermometer shell. Chamber 37 is then closed and connected through conduit 39 with a vacuum pump and is maintained under vacuum for a suitable period with the temperature sensitive liquid heated to a temperature such as 112 degrees Fahrenheit thereby assuring that the full length of the thermometer bore will be completely filled with liquid.

Thereafter the vacuum is discontinued, chamber 37 is opened, and thermometers are removed and individually sealed while hot. Sealing is easily accomplished by pinching their ends closed at a temperature adequate to fuse the plastic.

It will be understood that the graduated scale is readily readable without additional treatment. If desired, the indentations used to form the scale may be filled or coated with a distinctive dye or other coating. This is applied in any suitable manner, as by wiping a coated brush or pad across the surface of the graduations followed by buffing the flat surface of the thermometer body clear of the coating.

While the particular inexpensive clinical thermometer herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. That method of making an inexpensive throw-away clinical thermometer which comprises supporting the opposite ends of a tensioned small diameter flexible core forming wire assembly of uniform diameter throughout the major portion thereof and having an enlargement near one end generally centrally of a mold cavity, closing the mold parts, charging said mold cavity with transparent thermoplastic material, opening the mold and separating said core assembly endwise from the molded part from the larger diameter end of said core assembly, charging said bore from end-to-end with colored liquid having a high coefficient of expansion, and sealing said bore.

2. That method defined in claim 1 characterized in the step of forming one side wall of the mold cavity with temperature scale graduations coordinated with the expansion characteristics of said liquid.

3. That method of making a one-piece molded tubular body having a straight precision capillary passage of predetermined dimensions opening through the ends thereof which comprises, forming a pair of cooperating mold members with an elongated cavity corresponding in shape with the desired tubular body, supporting a tensioned core wire assembly having a portion of different cross-section restricted to one end thereof lengthwise of said cavity, closing said mold parts with said core wire tautly tensioned centrally of the mold cavity, charging said cavity with transparent thermoplastic material, opening said mold, and withdrawing said molded part from the larger end of said core wire.

4. That method defined in claim 3 characterized in the step of providing one side wall of said cavity with scale-forming indicia including graduation lines extending transversely of said elongated cavity.

5. That method defined in claim 4 characterized in the step of charging said mold cavity with uncured thermoplastic material from one end theerof through a plurality of passages equitably distributed about the sides of said tensioned core wire assembly.

6. That method of forming tubular body having a precision bore opening through the opposite ends thereof which method comprises threading a lengh of wire of uniform diameter through a close-fitting bore extending lengthwise of a thick-walled tubular member shaped to be detachably seated axially at one end of an elongated cavity between two mold members, seating said tubular member between a pair of mold members shaped to interfit with said member, tensioning said wire centrally of the mold cavity, charging the mold cavity with uncured thermoplastic material, curing said material, opening said mold members, and withdrawing said wire and the tubular member thereon from one end of the molded part.

7. That method defined in claim 6 characterized in the step of periodically substituting a new length of wire of the same uniform diameter in said thick-walled member and continuing to mold another tubular body using the new length of wire and the same thick-walled member used in molding the last previous molded tubular body.

8. That method defined in claim 6 characterized in that said mold members are formed with mating cavities cooperating to form a single long relatively-thin but wide cavity having a generally cylindrical chamber in axial alignment and in open communication with one end thereof.

9. That method defined in claim 6 characterized in the step of charging said mold cavity through a plurality of charging sprues spaced to either side of said tubular member and effective to charge uncured thermoplastic simultaneously into said cavity at a plurality of points spaced about the periphery of said tubular member.

10. A mold core assembly for use in casting a plastic elongated shell having an endless precision passage from end-to-end thereof of small diameter uniform cross-section opening at one end into a generally cylindrical charge chamber, said assembly comprising a high strength wire of uniform cross-section and shape, a thick walled tube secured axially about one end of said wire, and said tube including means adapted to hold the same detachably assembled to one end of a mold cavity formed between separable mold parts.

11. Apparatus for molding a one-piece plastic tubular shell comprising upper and lower mold members having a common elongated cavity therebetween when assembled against one another, a core assembly comprising a high strength wire of uniform cross-section having a portion of different diameter at one end, cooperating means for detachably seating one end of said core assembly centrally of one end of said cavity, and means at the other end of said cavity for placing said core assembly under tension along the longitudinal axis of said cavity.

12. Apparatus as defined in claim 11 characterized in that the portion of said core assembly of different diameters comprises a tubular element concentric with and closely embracing said high strength wire at one end of said cavity.

*13. A method of forming a plurality of thermometer bodies comprising the steps of: extending a core element across a mold cavity to dispose a forming portion thereof fully across said cavity; providing a transverse enlargement on said core element at one end of said cavity; molding plastic material about said core element forming portion and enlargement in said cavity to define a tubular molded body; moving said core element and enlargement with said molded body fixed thereon outwardly from said cavity; and causing relative movement of said body coaxially of said core element and away from said enlargement to remove said body from said core element forming portion and permitting redisposition of said core element across said cavity and said enlargement at said cavity end to permit subsequent molding of a second plastic body about said core element in said cavity.*

*14. The method of claim 13 wherein said enlargement forms a series of cylindrical bore portions in said body, said bore portions being sequentially larger toward said cavity end.*

*15. The method of claim 13 wherein said enlargement is fixed on said core element.*

*16. The method of claim 13 wherein said core element includes an end portion remote from said enlargement and disposed outwardly of said cavity, said molded body being disposed on said end portion subseqent to removal thereof from said forming portion.*

References Cited

The following references, cited by the Examiner, are of record in the patented file of this patent or the original patent.

UNITED STATES PATENTS

| | | | |
|---|---|---|---|
| 1,931,963 | 10/1933 | Morishita | 73—372 |
| 2,639,513 | 5/1953 | Ricord | 33—86 |
| 2,795,140 | 6/1957 | Loeb | 73—371 |
| 2,923,035 | 2/1960 | Schwartz | 18—36 |

FOREIGN PATENTS

| | | |
|---|---|---|
| 598,684 | 6/1934 | Germany. |
| 948,170 | 1/1949 | France. |

LOUIS A. PRINCE, Primary Examiner

W. A. HENRY II, Assistant Examiner

U.S. Cl. X.R.

73—371